United States Patent [19]
Poola et al.

[11] Patent Number: 5,649,517
[45] Date of Patent: Jul. 22, 1997

[54] VARIABLE OXYGEN/NITROGEN ENRICHED INTAKE AIR SYSTEM FOR INTERNAL COMBUSTION ENGINE APPLICATIONS

[75] Inventors: Ramesh B. Poola, Woodridge; Ramanujam R. Sekar, Naperville; Roger L. Cole, Elmhurst, all of Ill.

[73] Assignee: The University of Chicago, Chicago, Ill.

[21] Appl. No.: 710,520

[22] Filed: Sep. 18, 1996

Related U.S. Application Data

[63] Continuation-in-part of Ser. No. 598,029, Feb. 7, 1996, which is a continuation-in-part of Ser. No. 19,102, Feb. 18, 1993, Pat. No. 5,526,641.

[51] Int. Cl.$^6$ .................................................. F02B 23/00
[52] U.S. Cl. ........................................ 123/585; 60/274
[58] Field of Search .............................. 123/585; 60/274

[56] References Cited

U.S. PATENT DOCUMENTS

| | | | |
|---|---|---|---|
| 5,051,113 | 9/1991 | Nemser | 55/16 |
| 5,051,114 | 9/1991 | Nemser et al. | 55/16 |
| 5,400,746 | 3/1995 | Susa et al. | 123/25 C |
| 5,517,978 | 5/1996 | Yi | 123/585 |

*Primary Examiner*—Noah P. Kamen
*Attorney, Agent, or Firm*—Mason, Kolehmainen, Rathburn & Wyss

[57] ABSTRACT

An air supply control system for selectively supplying ambient air, oxygen enriched air and nitrogen enriched air to an intake of an internal combustion engine includes an air mixing chamber that is in fluid communication with the air intake. At least a portion of the ambient air flowing to the mixing chamber is selectively diverted through a secondary path that includes a selectively permeable air separating membrane device due a differential pressure established across the air separating membrane. The permeable membrane device separates a portion of the nitrogen in the ambient air so that oxygen enriched air (permeate) and nitrogen enriched air (retentate) are produced. The oxygen enriched air and the nitrogen enriched air can be selectively supplied to the mixing chamber or expelled to atmosphere. Alternatively, a portion of the nitrogen enriched air can be supplied through another control valve to a monatomic-nitrogen plasma generator device so that atomic nitrogen produced from the nitrogen enriched air can be then injected into the exhaust of the engine. The oxygen enriched air or the nitrogen enriched air becomes mixed with the ambient air in the mixing chamber and then the mixed air is supplied to the intake of the engine. As a result, the air being supplied to the intake of the engine can be regulated with respect to the concentration of oxygen and/or nitrogen.

18 Claims, 3 Drawing Sheets

VARIABLE OXYGEN/NITROGEN ENRICHED INTAKE AIR SYSTEM FOR INTERNAL COMBUSTION ENGINE APPLICATIONS

CROSS REFERENCE TO RELATED APPLICATION

This application is a continuation-in-part application of U.S. patent application Ser. No. 08/598,029 filed on Feb. 7, 1996, which in turn is a continuation-in-part application of U.S. patent application Ser. No. 08/019,102 filed on Feb. 18, 1993, now U.S. Pat. No. 5,526,641 both of which prior applications are assigned to the same assignee as the assignee of this application.

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

This invention relates to a method and apparatus for decreasing undesirable emissions in the exhaust of an internal combustion engine, and more particularly, to a new and improved method and apparatus for selectively introducing controlled quantities of oxygen and/or nitrogen enriched air into the intake of an internal combustion engine to thereby decrease the undesirable emissions that are present in the exhaust of the internal combustion engine.

2. Background of the Invention

Compression ignition (diesel) engines typically have high exhaust emissions, such as particulates, visible smoke, and oxides of nitrogen ($NO_x$). Environmental Protection Agency (EPA) emissions standards require simultaneous reduction of $NO_x$ and particulate emissions to very low levels. This tends to be difficult to achieve because of the inherent tradeoffs between lowering both particulates and $NO_x$ emissions from a diesel engine. While it is possible in a diesel engine to reduce particulate emissions and to improve power density performance by using oxygen enriched intake air, such oxygen enriched intake air tends to also increase the amount of $NO_x$ in the exhaust being emitted from the diesel engine.

The type and amount of emissions in the exhaust of a spark ignition engine also is of concern. In order to meet the California Air Resources Board (CARB), Low Emission Vehicle (LEV) and Ultra Low Emission Vehicle (ULEV) standards, substantial reductions are required for carbon monoxide (CO) and hydrocarbon (HC) emissions from a spark ignition engine during the cold phase of the federal test procedure cycle. Similarly, many light-duty passenger cars are required to decrease these emissions to comply with United States EPA's Tier-II (year 2004) standards. This growing concern over start-up/cold-phase emissions has led to various attempts to develop new emissions treatment techniques that decrease the HC and CO levels in the exhaust emissions.

Attempts have been made by others to decrease cold-phase (i.e., the first 505 seconds of federal test procedure driving cycle, as specified in the Code of Federal Regulations, Title 40, Part 86, Subpart 8, revised 1993) emissions by after-treatment methods. These methods can be grouped as follows: (1) thermal management of the catalytic converter, including low-mass manifolds, double-walled exhaust pipes, electrically heated catalysts, exhaust-gas burners, exhaust-gas igniters, and insulated converters (with vacuum or refractory material); (2) placement of the converter closer to the exhaust manifold; and (3) management of the interaction between the hydrocarbons and the catalyst, using hydrocarbon adsorbent or traps in the exhaust. However, durability, fuel penalty, additional capital costs, unwanted heat in the engine compartment, and the complexity of these systems limit their application in vehicles.

An alternative to such after-treatment methods is to control the emissions at the source itself (i.e., during combustion). One type of in-cylinder emission control is to introduce oxygen enriched air instead of ambient air to the air intake of the engine. Use of such oxygen enriched air can potentially decrease CO and HC emissions from a spark ignition engine, even during start-up and warming up periods, because oxygen enrichment of the intake air decreases the emissions from the engine rapidly (even when the engine is cold). In fact, it helps to minimize the catalytic converter limitations during the cold phase operation of the engine and should improve catalytic converter efficiency. This method has the advantage of fewer add-on components, of lesser mechanical complexities, of not altering the fuel economy of the engine, and of an easier to modify system (the air intake system is easier to modify than the exhaust system).

Even though the oxygen enrichment of the intake air in spark ignition engine powered vehicles results in the lowering of cold-phase HC and CO emissions in the exhaust of the vehicle, it tends to result in an increase in $NO_x$ in the exhaust due to higher combustion temperatures. To some extent, the increase in $NO_x$ in the emissions can be offset by $NO_x$ control technologies that can remove nitrogen oxides from the emissions. These technologies include lean $NO_x$ catalysts and the injection into the exhaust gases of monatomic-nitrogen induced by a pulse arc (see, for example, U.S. Pat. No. 5,526,641 that is assigned to the same assignee of record as the present application).

In the case of both diesel and spark ignition engines, exhaust gas recirculation (EGR) systems have been used as one method of decreasing $NO_x$ emissions. When the gases from the EGR system are about 50% of the intake air, oxygen concentration is decreased from about 21% to about 14%. The decrease of $NO_x$ by the use of EGR systems tends to vary depending on the rate, temperature and water content of the EGR gases, injection timing, and air-fuel ratio of the intake to the engine. However, there are limits as to the amount of exhaust gases that can be reintroduced into the engine before power output and fuel economy are adversely affected. Such reintroduction of exhaust gases can also cause wear problems and oil contamination, particularly in the case of diesel engines where the recirculated gases include soot particles. The results obtained by using an EGR system are considered similar to the dilution of intake air with inert gases such as nitrogen because in both cases the intake oxygen concentration is decreased and the heat capacity of the intake air is increased. While the benefits of using EGR systems and nitrogen enriched air in the intake air of an engine to lower the $NO_x$ emissions are similar, the advantages of using nitrogen enriched air over recirculated gases from an EGR system are (i) the elimination of unwanted exhaust species (such as soot particles) being introduced into the engines intake, (ii) the elimination of heat exchangers to cool and control the temperature and water content of the exhaust gases to be recirculated, and (iii) the elimination of poor utilization of intake air (higher displacement of intake air).

Notwithstanding the advantages of introducing oxygen enriched air and/or nitrogen enriched air into the intake of an engine, the lack of an economical source of on-line oxygen and nitrogen has made it difficult to provide a practical application of the concept of providing oxygen and nitrogen enriched air to the air intake of the engine during various phases or time periods of operation of the engine. Relatively compact oxygen enrichment devices, such as selectively permeable membranes, have been used to provide oxygen enriched air to the air intake of an internal combustion engine (see U.S. Pat. No. 5,526,641 and U.S. patent application Ser. No. 08/598,029, filed on Feb. 7, 1996, both of which are assigned to the same assignee of record as the present application). Any such system requires a relatively simple, compact mechanical system driven by the engine itself that will economically extract oxygen and nitrogen from the ambient air and provide oxygen enriched and/or nitrogen enriched air to the air intake of the engine during particular phases or time periods of operation of the engine.

Accordingly, it is an object of the present invention to provide a new and improved method and apparatus for decreasing particulate, HC, CO and $NO_x$ emissions in the exhaust of an internal combustion engine by selectively introducing oxygen enriched and/or nitrogen enriched air into the air intake of the engine vehicle during selected periods or phases of operation of the engine.

It is another object of the present invention to provide a new and improved method and apparatus for introducing oxygen enriched and/or nitrogen enriched air into the air intake of an internal combustion engine by diverting at least a portion of the intake air through a selectively permeable membrane so that oxygen enriched and/or nitrogen enriched air can be supplied to the engine intake manifold for selected periods of time during the operation of the engine and nitrogen enriched air can be supplied to a monatomic-nitrogen plasma generator that enables the chemical reduction of $NO_x$ in the exhaust of the engine.

It is yet another object of the present invention to provide a new and improved method and apparatus for introducing oxygen enriched and/or nitrogen enriched air into the air intake of an internal combustion engine by diverting at least a portion of the intake air through a selectively permeable membrane so that ambient air, oxygen enriched air and/or nitrogen enriched air can be selectively supplied to a mixing chamber and then from the mixing chamber to the engine intake manifold during selected periods of time of operation of the engine.

SUMMARY OF THE INVENTION

In accordance with these and many other objects of the present invention, an air intake system for an internal combustion engine embodying the present invention includes an air supply control system that enables ambient air, oxygen enriched air and/or nitrogen enriched air or a combination of each to be supplied to the intake of the engine. During normal operation of the engine, ambient or atmospheric air from an air intake device flows to a mixing chamber and from the mixing chamber into an intake manifold of the engine. In order to decrease the amount of undesirable emissions in the exhaust gases produced by the engine during particular phases of the operation of the engine, at least a portion of the ambient air flowing from the air intake device is diverted so that the diverted air flows through a secondary path that includes a selectively permeable air separating membrane device. The ambient air being diverted through the secondary path flows through the permeable membrane device due to a pressure differential established across the membrane device. This pressure differential can be established by a blower at the input of the membrane device and a vacuum pump at the output of the membrane device. Alternatively, the differential pressure is established across the membrane device when a compressor is used to supply compressed air to the input side of the membrane device.

As the air flows through the permeable membrane device, a portion of the nitrogen in the ambient air is separated from the air so that oxygen enriched air (permeate) and nitrogen enriched air (retentate) are produced. The oxygen enriched air can be selectively supplied through a control valve to the mixing chamber or expelled to atmosphere. The nitrogen enriched air similarly can be supplied through a control valve to the mixing chamber or expelled to atmosphere. Alternatively, a portion of the nitrogen enriched air can be supplied through another control valve to a monatomic-nitrogen plasma generator or $NO_x$ control device that forms atomic nitrogen from the nitrogen enriched air which atomic nitrogen is then injected into the exhaust of the engine to chemically reduce some of the $NO_x$ within the exhaust gases being emitted by the engine. The oxygen enriched air, the nitrogen enriched air, or ambient air or combinations thereof supplied to the mixing chamber become mixed within the mixing chamber and then the mixed air is supplied to the intake of the engine. As a result, the air being supplied to the intake of the engine can be regulated with respect to the concentration of oxygen and/or nitrogen.

In another embodiment of the present invention, the air supply control system of the present invention enables ambient air and nitrogen enriched air to be combined and supplied to the intake of a diesel type engine that includes a turbocharger. Pressurized ambient air is supplied by a turbocompressor operated by the turbocharger. A portion of the pressurized ambient air flows to a mixing chamber. Another portion of the pressurized ambient air flows through a secondary path that includes a selectively permeable air separating membrane device due to a pressure differential established across the membrane device.

As the air flows through the permeable membrane device, a portion of the nitrogen in the ambient air is separated from the air so that oxygen enriched air (permeate) and nitrogen enriched air (retentate) are produced. The oxygen enriched air is vented to atmosphere. The nitrogen enriched air can be supplied through a control valve to the mixing chamber or expelled to atmosphere. Alternatively, a portion of the nitrogen enriched air can be supplied through another control valve to a monatomic-nitrogen plasma generator or $NO_x$ control device. The nitrogen enriched air and ambient air supplied to the mixing chamber become mixed within the mixing chamber and then the mixed air is supplied to the intake of the engine. As a result, the concentration of nitrogen in the air being supplied to the intake of the engine can be regulated.

BRIEF DESCRIPTION OF THE DRAWINGS

These and many other objects and advantages of the present invention will become readily apparent from consideration of the following detailed description of the embodiment of the invention shown in the accompanying drawing wherein.

DETAILED DESCRIPTION OF THE PREFERRED EMBODIMENT

Figure 1:
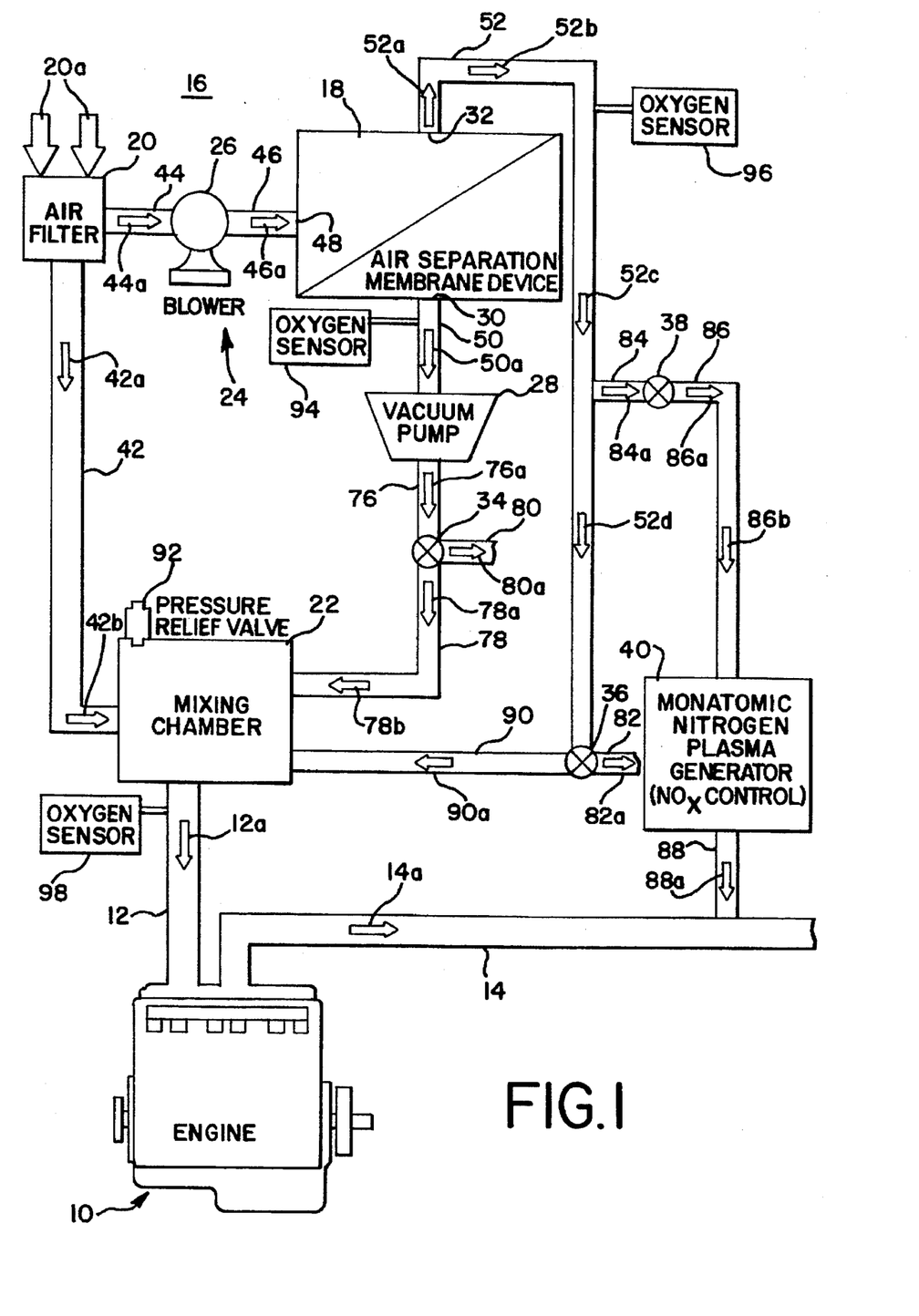
FIG. 1 is a diagrammatic illustration of an internal combustion engine with an air intake control system which supplies oxygen enriched and/or nitrogen enriched air to the intake of the engine and which embodies the present invention.

Referring now more specifically to FIG. 1, therein is disclosed a diagrammatic representation of an internal combustion engine 10 having an intake line or duct 12 through which air is supplied to an intake manifold of the engine 10 to be combined with combustible fuel in the engine 10 and an exhaust line or duct 14 through which is expelled exhaust gases from an exhaust manifold in the engine 10. In the case where the engine 10 is a spark ignition type of engine, the exhaust gases flowing through the exhaust line 14 can contain a number of different pollutants including carbon monoxide (CO), hydrocarbon (HC), and oxides of nitrogen ($NO_x$) whereas in the case where the engine 10 is a diesel type engine, the exhaust gases may contain particulates, and visible smoke and oxides of nitrogen. In order to limit the amount of these undesirable emissions that are present in the exhaust gases being emitted from the engine 10 through the exhaust line 14, the engine 10 is provided with an air supply control system that is generally designated by the reference numeral 16 and that embodies the present invention.

The air supply control system 16 includes an oxygen enrichment or air separation membrane device 18 that separates nitrogen from ambient air flowing through the device 18 such that oxygen enriched air and nitrogen enriched air are produced. During normal operation of the engine 10, ambient or atmospheric air flowing through an air filter or air intake device 20 flows to a mixing chamber or air plenum 22 and from the mixing chamber 22 to the engine 10 through the air intake line 12. In order to supply oxygen enriched air and/or nitrogen enriched air as well as possibly ambient air to the air intake line 12 during selected phases of the operation of the engine 10, at least a portion of the ambient air flowing through the air filter 20 is diverted through a secondary path 24 in response to the actuation of a blower 26 and a vacuum pump 28 in the secondary path 24. The ambient air diverted into the secondary path 24 flows through the permeable membrane device 18 due to a pressure differential established across the membrane device 18 by the blower 26 and the vacuum pump 28. As the air flows through the membrane device 18, a portion of the nitrogen in the ambient air is separated so that oxygen enriched air (permeate) flows from an output 30 of the membrane device 18 and nitrogen enriched air (retentate) flows from an output 32 of the membrane device 18.

A control valve 34 controls the flow of the oxygen enriched air as it flows from the output 30 so that the oxygen enriched air is selectively supplied through the control valve 34 to the mixing chamber 22 or is expelled to atmosphere. The nitrogen enriched air similarly can be supplied through a control valve 36 to the mixing chamber 22 or expelled to atmosphere. Alternatively, at least a portion of the nitrogen enriched air can be supplied through a control valve 38 to a monatomic-nitrogen plasma generator or $NO_x$ control device 40 that forms atomic nitrogen from the nitrogen enriched air which atomic nitrogen then can be inject into the exhaust 14 of the engine 10 to reduce the amount of $NO_x$ within the exhaust gases being emitted by the engine 10. The oxygen enriched air, the nitrogen enriched air, or ambient air or combinations thereof supplied to the mixing chamber 22 become mixed within the mixing chamber 22 and then the mixed air is supplied to the intake line 12 of the engine 10. As a result, the air being supplied to the intake manifold of the engine 10 can be regulated with respect to the concentration of oxygen and/or nitrogen.

As previously indicated, ambient air flowing into the air filter 20 (as represented by arrows 20a) normally flows through an air duct 42 (as indicated by arrows 42a and 42b) to the mixing chamber 22. As long as the control valves 34 and 36 are operated to prevent any flow of air from the outputs 30 and 32 of the membrane device 18 to the mixing chamber 22, the ambient air flowing into the mixing chamber 22 will flow into the air intake line 12 (as indicated by an arrow 12a) due to the vacuum being produced at the intake manifold of the engine 10. The ambient air flowing into the intake manifold of the engine 10 then can be combined with a combustible fuel within the engine 10.

The engine 10 may be any type of internal combustion engine in which air supplied through the intake line 12 is combined with a combustible fuel. Such engines include both spark ignition and diesel engines. As is the case with all such internal combustion engines, exhaust gases are produced that are expelled through the exhaust line 14 (as indicated by an arrow 14a). In the case of spark ignition engines, these exhaust gases typically will include pollutants such as carbon monoxide (CO), hydrocarbon (HC), and oxides of nitrogen ($NO_x$). In the case of diesel engines, the exhaust gases may include particulates, such as soot, visible smoke, and oxides of nitrogen ($NO_x$).

In certain phases or periods of operation of the engine 10, it is desired to decrease the CO and HC that are being expelled through the exhaust line 14. In the case when the engine 10 is a spark ignition type engine, this is particularly true during the first few minutes of operation of the engine 10 after it is started. During this period of operation of a spark ignition engine, the engine block and exhaust manifold of the engine 10 are cold and the emissions are not efficiently converted by the catalytic converter that can be used with the engine 10 when it has not reached a sufficient elevated temperature. Moreover, it is a common practice to operate such spark ignition engines, like the engine 10, with richer fuel-air mixtures during initial start-up and warming-up periods for proper operating drive-ability and acceleration. However, the rich fuel mixture tends to result in an increase in the CO and HC in the emissions being expelled through the exhaust line 14.

In order to limit the amount of such pollutants in those emissions, oxygen enriched air can be supplied through the air intake line 12 to the engine 10. In order to provide the oxygen enriched air to the air intake line 12, the blower 26 and the vacuum pump 28 will be actuated electronically (the blower 26 and the vacuum pump 28 can be mechanically driven from the engine 10 or electrically driven with power from the electrical system (i.e., the alternator) of the engine 10). With the blower 26 and the vacuum pump 28 so actuated, at least a portion of the air flowing into the air filter 20 will be diverted to the secondary path 24 such that the diverted air will flow into an air duct 44 (as indicated by an arrow 44a), through the blower 26 and into an air duct 46 (as indicated by an arrow 46a) toward an input 48 of the membrane device 18. The diverted ambient air will flow toward the input 48 of the membrane device 18 through the air ducts 44 and 46 due to the differential pressure that is established across the input 48 and output 30 of the membrane device 18 by the blower 26 and the vacuum pump 28 with the pressure being higher at the input 48 as compared to the output 30. This differential in pressure across the membrane device 18 will result in the diverted air flowing into the input 48 and through the membrane device 18 so that oxygen enriched air will permeate from the higher pressure, upstream side of the membrane device 18 at the input 48 to the lower pressure, downstream side of the membrane device 18 at the outlet 30 and thereby to an outlet duct 50 and the nitrogen enriched air will likewise flow out of the output 32 to an outlet duct 52.

The membrane device 18 is adapted to separate oxygen and nitrogen present in the air being supplied through the input 48 so as to produce oxygen enriched air (permeate) at the outlet 30 and nitrogen enriched air (retentate) at another outlet 32. The membrane device 18 can be of the type having a selectively permeable membrane that can separate or enrich gaseous mixtures. An example of such a membrane is disclosed in U.S. Pat. Nos. 5,051,113 and 5,051,114, both having been issued on Sep. 24, 1991. As indicated in those patents, such a membrane can be used to produce oxygen enriched air by separating oxygen and nitrogen present in the air.

Figure 2:
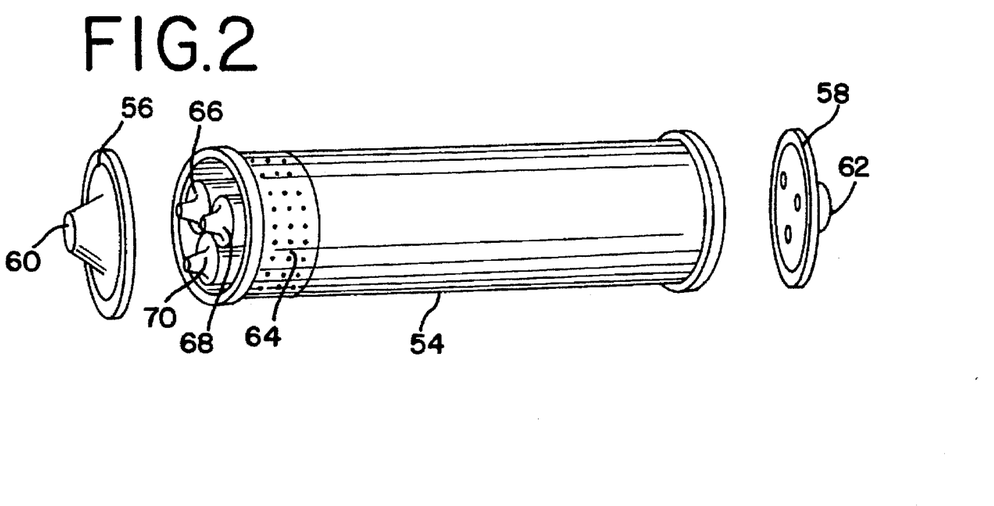
FIG. 2 is a partially exploded perspective view of an oxygen and nitrogen enrichment device that can be used in the air intake control systems of FIG. 1.

An example of one possible configuration for such a membrane device 18 is illustrated in FIGS. 2 and 3A–3C. As is illustrated in FIG. 2 for a countercurrent flow configuration for the membrane device 18 (other flow configurations can be used, such as co-current and cross flow), the membrane device 18 may be in the form of cylindrical outer housing 54 with opposed end caps 56 and 58 closing the ends of the housing 54 and providing respectively, an input 60 to be connected to the input 48 and an output 62 for the nitrogen enriched air to be connected to the output 32. The oxygen enriched air will flow through openings 64 in the outer housing 54 that are connected to the output 30.

Figure 3A:
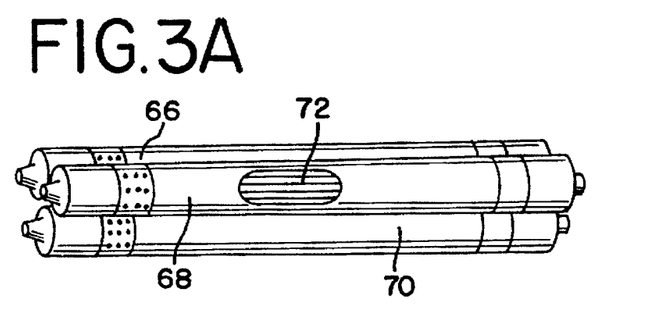
FIGS. 3A–3C are illustrations of components from the oxygen and nitrogen enrichment device of FIG. 2.
Figure 3B:
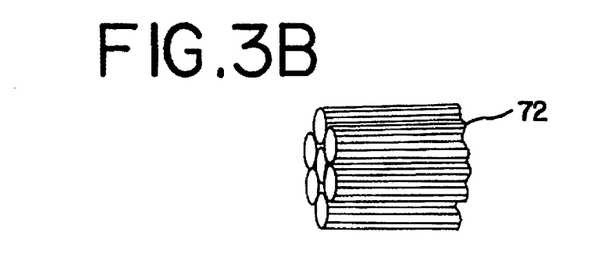
Figure 3C:
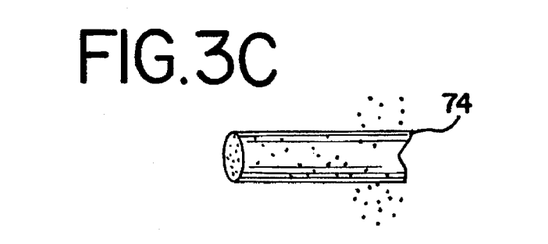

As illustrated in FIGS. 2 and 3A, three cartridges 66, 68, and 70 are disposed within the housing 54 (the housing 54 may utilize different numbers of cartridges). Each of the cartridges 66, 68, and 70 contain fiber bundles, such as bundle 72 illustrated in FIG. 3B. The fiber bundles 72 can be formed of hollow polymer fibers in an asymmetric structure (a hollow fiber 74 is illustrated in FIG. 3C).

The capability of the membrane device 18 (in terms of throughput capacity and ability to separate the components in the ambient air flowing through the membrane device 18 from the input 48 to the outputs 30 and 32) is determined in part by the properties of the membrane material coated (inside or outside) on the hollow fibers 74 (permeability and selectivity), by stage cut (percent recovery of the permeate stream) and by the operating conditions of temperature and differential pressure across the membrane device 18. The size of the housing 54 of the membrane device 18 depends on the skin thickness of the coating, the arrangement of the fibers 74 for best packing density and geometry, and the mode of operation (vacuum, pressure or a combination of both across the membrane device 18). Due to the fact that the air flow control system 16 needs to be mounted in the engine compartment of an automobile or truck, the size of the housing 54 is a significant limiting design criteria for the air flow control system 16 for automotive engine applications. While membrane material can be made of rubbery polymers (silicon rubber) or glassy polymers (ethyl cellulose and polysulfone), perfluorodioxole membrane material of the type disclosed in U.S. Pat. No. 5,051,114 possibly is more suitable for the hollow fibers 74, particularly in automotive applications.

The particular percentage of oxygen contained within the air flowing out from the output 30 of the membrane device 18 and the particular percentage of nitrogen contained within the air flowing out from the output 32 of the membrane device 18 can be adjusted by providing the proper membrane device 18. In this regard, the membrane surface area and the pressure differential across the membrane device 18 will in part determine the amount of nitrogen separated from the ambient air and thereby the percentage of oxygen within the air flowing out from the output 30 and the percentage of nitrogen within the air flowing out from output 32. In general, the oxygen enriched air flowing from the output 30 may contain about 23% to 30% oxygen concentration by volume and the nitrogen enriched air flowing from the output 32 may contain about 79% to 98% nitrogen concentration by volume.

Once the oxygen enriched air is produced by the membrane device 18, it will flow from the output 30 through the air duct 50 (as indicated by an arrow 50a), through the vacuum pump 28 and through an air duct 76 (as indicated by an arrow 76a) to the control valve 34. When oxygen enriched air is to be supplied to the mixing chamber 22, the control valve 34 is operated so that at least a portion of the oxygen enriched air flowing through the air duct 76 flows through the control valve 34 and an air duct 78 (as indicated by arrows 78a and 78b) into the mixing chamber 22. The control valve 34 also can direct a portion of or all of the oxygen enriched air flowing in the air duct 76 to atmosphere by diverting the air flow to an air duct 80 such that the diverted air will flow as indicated by an arrow 80a to atmosphere. The amount of oxygen enriched air that the control valve 34 will allow to flow through the air duct 78 to the mixing chamber 22 is in part dependent on the concentration of oxygen that is to be in the air that is supplied to the air intake line 12 from the mixing chamber 22.

In the event that only oxygen enriched air is to be supplied to the air intake line 12 (for example, 23% to 30% oxygen concentration by volume), the control valve 34 will be operated to supply oxygen enriched air to the mixing chamber 22. The control valve 36 also will be operated to expel any of the nitrogen enriched air flowing in the air duct 52 (as indicated by arrows 52a, 52b, 52c and 52d) to atmosphere through an air duct 82 (as indicated by an arrow 82a). At least some of the nitrogen enriched flowing in the air duct 52 can be diverted through air ducts 84 and 86 by the actuation of the control valve 38 so that the diverted nitrogen enriched air will be supplied to the monatomic-nitrogen plasma generator $NO_x$ control device 40. The so diverted nitrogen enriched air can be used by the $NO_x$ control device 40 to reduce $NO_x$ in the exhaust gases flowing in the exhaust line 14.

While controlling the amount of oxygen in the intake air being supplied to the engine 10 can aid in diminishing the amount of $NO_x$ in the exhaust gases flowing in the exhaust line 14, the exhaust gases nevertheless will tend to have too high a level of $NO_x$ especially during the operating time of the engine 10 when oxygen enriched air is being supplied to the air intake line 12 in order to decrease HC and CO emissions in the exhaust gases flowing in the exhaust line 14. As is disclosed in the above referred to U.S. Pat. No. 5,526,641, the amount of $NO_x$ in the exhaust of an internal combustion engine, such as the engine 10, can be reduced by the injection of atomic nitrogen into the exhaust of the engine. In the case of the air control system 16, at least some of the nitrogen enriched air produced by the membrane device 18 and flowing in the air duct 52 can be supplied to the $NO_x$ control device 40 when the control valve 38 is operated to permit the flow of the nitrogen enriched air through the duct 84 (as indicated by an arrow 84a) and the air duct 86 (as indicated by an arrow 86a). The molecular nitrogen in the nitrogen enriched air supplied to the $NO_x$ control device 40 is subjected to a corona or arc discharge so as to create a plasma. As a result, atomic nitrogen is produced and this atomic nitrogen then flows through a duct 88 (as indicated by an arrow 88a) so as to be injected into the exhaust line 14. The injection of the atomic nitrogen into the exhaust gases flowing in the exhaust line 14 causes the oxides of nitrogen to be chemically reduced into nitrogen and oxygen such that the emissions from the engine 10 will have acceptable, lower levels of $NO_x$.

In situations where the air to be supplied through the air intake line 12 to the engine 10 is to contain a high concentration of nitrogen (for example 80% to 90% nitrogen concentration by volume), the control valve 36 is operated to permit the nitrogen enriched air flowing in the air duct 52 (as indicated by the arrows 52a, 52b, 52c, and 52d) to flow through an air duct 90 (as indicated by an arrow 90a) to the mixing chamber 22 instead of being expelled to atmosphere through the air duct 82. At the same time, the control valve 34 can be actuated to expel all of the oxygen enriched air flowing in the air duct 76 to atmosphere through the air duct 80. The nitrogen enriched air flowing into the mixing chamber 22 from the duct 90 and the ambient air flowing into the mixing chamber 22 from the air duct 42 will mix within the mixing chamber 22 so that air with the desired concentration of oxygen and nitrogen can be supplied to the engine 10.

The amount of ambient air supplied to the mixing chamber 22 and the amount of oxygen enriched air and/or nitrogen enriched air supplied to the mixing chamber 22 is in part dependent on the vacuum being produced at the air intake line 12 by the operation of the engine 10 and the levels of operation of the blower 26 and the vacuum pump 28. As the blower 26 and the vacuum pump 28 are operated at higher levels to establish a higher differential pressure across the membrane device 18, the air within the mixing chamber 22 that is supplied to the air intake line 12 will contain a higher percentage of oxygen enriched air and/or nitrogen enriched air being supplied respectively through the air ducts 78 and 90 as compared to the ambient air that is being supplied through the air duct 42. On the other hand, the amount of ambient air supplied through the air duct 42 to the mixing chamber 22 will be increased as the blower 26 and the vacuum pump 28 are operated at lower levels due to the decrease in the differential pressure across the membrane device 18. In order to ensure that the air within the mixing chamber 22 does not become over pressurized or supercharged, a pressure relief valve 92 is used with the mixing chamber 22 to exhaust to atmosphere air in the mixing chamber 22 in the event that the pressure in the mixing chamber 22 increases beyond a preselected level.

As can be appreciated, it is preferable to control the operation of the control valves 34, 36, and 38 as well as the blower 26 and the vacuum pump 28 from a central control unit. By having the control valves 34, 36, and 38, the blower 26 and the vacuum pump 28 operated from a central control unit, the control unit can be calibrated for the particular engine 10 based at least in part on the engine load and speed so that the intake air flowing in the intake line 12 to the engine 10 has the correct oxygen to nitrogen ratio during various phases or times of operation of the engine 10. The control unit additionally can be provided information as to the concentration of oxygen in the air flowing from the outputs 30 and 32 of the membrane device 18 and from the mixing chamber 22 so that the control valves 34 and 36 also can be controlled based on the concentration of oxygen to nitrogen ratio in the air being supplied to the engine 10. For example, an oxygen sensor 94 can be coupled to the air duct 50 to provide information of the oxygen concentration in the air flowing from the permeate output 30 of the membrane 18, an oxygen sensor 96 can be coupled to the air duct 52 to provide information of the oxygen concentration in the air flowing from the retentate output 32 of the membrane device 18 and an oxygen sensor 98 can be coupled to the air intake line 12 to provide information of the oxygen concentration in the air being supplied from the mixing chamber 22 into the engine 10. In this manner, undesirable emissions in the exhaust gases flowing through the exhaust line 14 from the engine 10 can be decreased to acceptable levels.

By way of example, oxygen enriched air having 23% to 25% oxygen concentration by volume can be supplied through the air ducts 50 and 78 to the mixing chamber 22 and then to the air intake line 12 during initial periods of start-up and warming-up (for example, the first 127 seconds) and during other periods of operation of spark ignition engines. In certain cases, the vacuum pump 28 need not be used. Instead, intake manifold vacuum at the air intake 12 alone will be sufficient to produce the desired pressure differential across the membrane device 18. The supplying of such oxygen enriched air results in the reduction in the exhaust line 14 of the engine 10 of HC, CO, other federally regulated air toxics (such as acetaldehyde, formaldehyde, benzene, and 1,3-butadiene) and ozone-forming potential pollutants.

In the case of compression-ignition (diesel) engines, oxygen enriched air having 23% up to 30% oxygen concentration by volume can be supplied via the air ducts 50 and 78 and the mixing chamber 22 to the air intake line 12 to decrease the visible smoke and particulates from such engines. Increasing the oxygen content of the air flowing into the diesel engine 10 results in faster burn rates and in the ability of the engine 10 to burn more fuel. Consequently, this tends to increase the thermal efficiency and power output of a diesel engine. Moreover, the use of oxygen enriched air in the air intake 12 of the diesel engine 10 also can enable shorter ignition delays and offers the potential for burning lower grade and non-petroleum fuels. While $NO_x$ emissions may increase with the use of oxygen enriched air in such diesel engines, this type of emissions could be controlled by optimizing the intake air oxygen enrichment levels, retarding the fuel injection timing, adding water either in the intake air or with the fuel and by using $NO_x$ control technologies to reduce $NO_x$ in the exhaust being emitted from the engine 10.

Oxygen enriched intake air also can be used with alternative fuel vehicles. For example, using 23% to 25% oxygen concentration by volume in the intake air of vehicles using blends of methanol or ethanol with gasoline can reduce formaldehyde emissions. In the case of natural gas fueled vehicles, the oxygen enrichment of intake air to 23% to 28% oxygen concentration by volume can increase the power density and results in the reduction of HC, CO and air toxics in the exhaust.

As previously discussed, nitrogen enriched air also can be provided to the mixing chamber 22. In the case of spark ignition engines, the supplying of air with 80% to 90% nitrogen concentration by volume to the air intake 12 through the mixing chamber 22 can result in the reduction of $NO_x$ emissions in the exhaust 14 of the engine 10. In this regard, the addition of nitrogen enriched air to the intake of the engine 10 tends to act as a diluent to reduce the combustion temperatures within the engine 10 and thus lower the $NO_x$ formation in the engine 10. In the case of diesel engines, a similar nitrogen concentration for the intake air (80% to 90% nitrogen concentration by volume) lowers the intake oxygen concentration and increases the total heat capacity of the intake charge so that $NO_x$ emissions are lowered.

The nitrogen enriched air flowing through the air duct 52 also can be diverted through the control valve 38 to the monatomic-nitrogen plasma generator 40. The nitrogen enriched air that is so diverted may, for example, contain 95% to 98% nitrogen concentration by volume.

Figure 4:
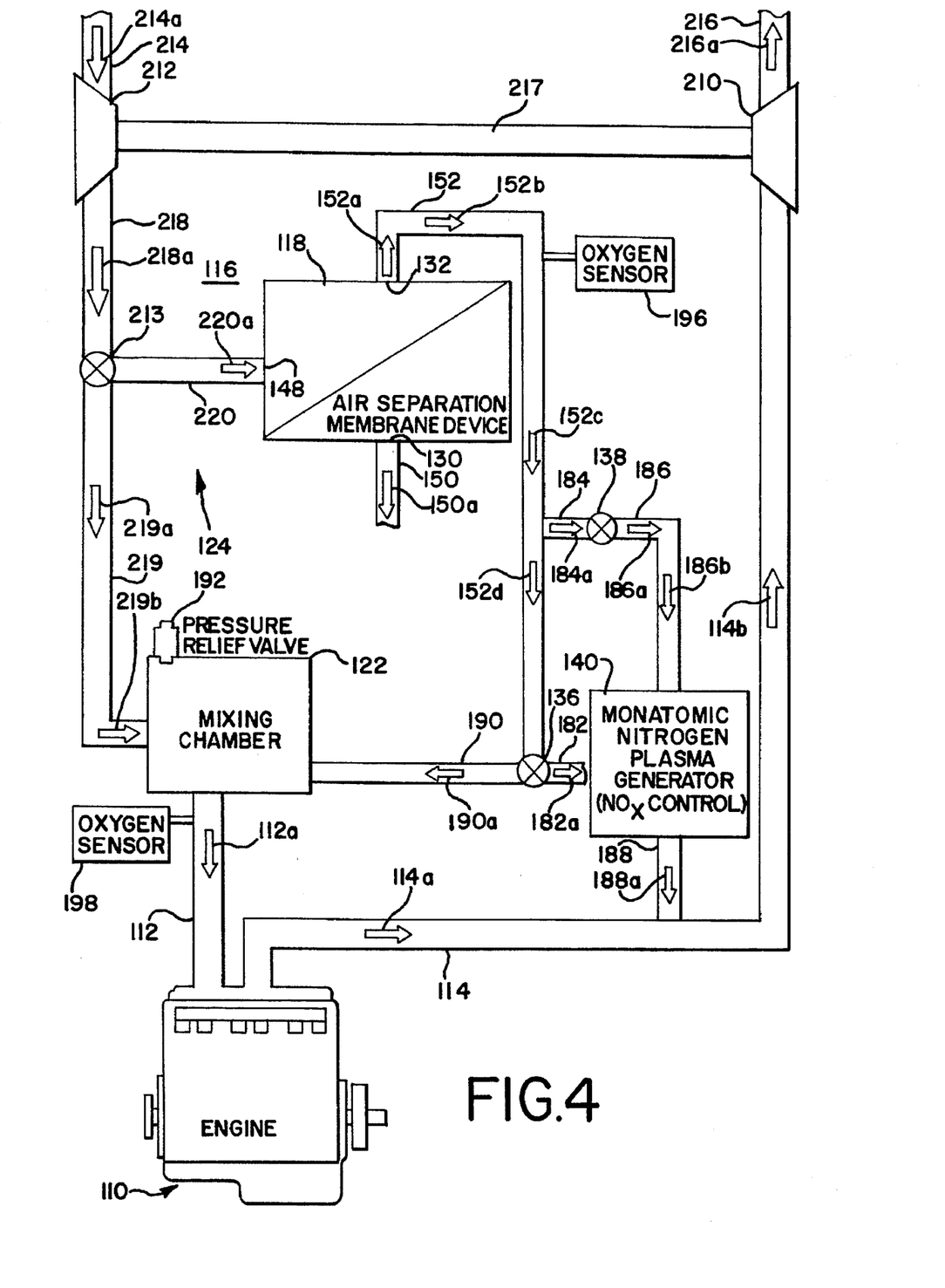
FIG. 4 is a diagrammatic illustration of another embodiment of the present invention wherein an air intake control system is used to supply nitrogen enriched air to the intake of the engine.

Referring now more specifically to FIG. 4, therein is disclosed a diagrammatic representation of another embodiment of an air supply control system that is generally designated by the reference numeral 116 and that embodies the present invention. The air supply control system 116 utilizes many of the same components utilized in the air supply control system 16. Consequently, the components of the air supply control system 116 that are specifically referred to herein are referenced by the same reference numeral as corresponding components in the air supply control system 16 except that the quantity 100 has been added to the reference numerals.

The air supply control system 116 is specifically designed for use with a diesel type engine 110 that utilizes a turbocharger 210 to supply compressed air to the air supply control system 116. In such turbocharged diesel engines, the level of $NO_x$ in the exhaust from the engine 116 through an exhaust line 114 can be decreased by the supplying of nitrogen enriched air to an air intake line 112 of the engine 116. The air supply control system 116 provides such nitrogen enriched air and includes an air separation membrane device 118 that separates nitrogen from ambient air flowing through the device 118 such that oxygen enriched air and nitrogen enriched air are produced. In order to supply nitrogen enriched air and/or ambient air to the air intake line 112 during selected phases of the operation of the engine 110, at least a portion of the ambient air flowing through a turbocompressor 212 to an air mixing device 122 is diverted through a control valve 213 to a secondary path 124. The ambient air diverted into the secondary path 124 flows through the permeable membrane device 118 due to a pressure differential established across the membrane device 118 by the turbocompressor 212. As the air flows through the membrane device 118, a portion of the nitrogen in the ambient air is separated so that oxygen enriched air (permeate) flows from an output 130 of the membrane device 118 and nitrogen enriched air (retentate) flows from an output 132 of the membrane device 118.

The nitrogen enriched air can be supplied through a control valve 136 to the mixing chamber 122 or expelled to atmosphere. Alternatively, at least a portion of the nitrogen enriched air can be supplied through a control valve 138 to a monatomic-nitrogen plasma generator or $NO_x$ control device 140 that forms atomic nitrogen from the nitrogen enriched air which atomic nitrogen then can be inject into the exhaust 114 of the engine 110 to reduce the amount of $NO_x$ within the exhaust gases being emitted by the engine 110. The nitrogen enriched air and ambient air supplied to the mixing chamber 122 become mixed within the mixing chamber 122 and then the mixed air is supplied to the intake line 112 of the engine 110. As a result, the concentration of nitrogen within the air being supplied to the intake manifold of the engine 110 can be regulated.

As previously indicated, ambient air flowing into the compressor 212 through an air duct 214 (as indicated by an arrow 214a) is compressed by the turbocompressor 212 that is driven by the turbocharger 210. The exhaust gases flowing through the exhaust line 114 pass through the turbocharger 212 as indicated by the arrows 114a and 114b and are exhausted to atmosphere through a duct 216 (as indicated by an arrow 216a). The movement of the exhaust gases through the turbocharger 212 turns a shaft 217 that is coupled to the turbocompressor 212 so that air drawn through the duct 214 is compressed and supplied under pressure to an air duct 218. In the event that all of the compressed air from the turbocompressor 212 flowing in the air duct 218 (as indicated by an arrow 218a) is to be supplied to the mixing chamber 122 (i.e., when no nitrogen enriched air is to be supplied to the intake line 112 of the engine 110), the control valve 213 is operated so that all of the air flowing in the air duct 218 (as indicated by the arrow 218a) flows through an air duct 219 (as indicated by arrows 219a and 219b) to the mixing chamber 122. As long as the control valve 213 is operated to direct all of the ambient air flowing in the air duct 218 to the mixing chamber 122 through the air duct 219 and whenever the control valve 136 is operated to prevent any flow of air from the output 132 of the membrane device 118 to the mixing chamber 122, only ambient air will flow into the mixing chamber 122 and then into the air intake line 112 (as indicated by an arrow 112a) due to the pressure being produced by the turbocompressor 212 on the inlet air. The ambient air flowing into the intake manifold of the engine 110 then can be combined with a combustible fuel within the engine 110.

As is the case with all such internal combustion engines, exhaust gases are produced that are expelled through the exhaust line 114 (as indicated by the arrow 114a). In the case of the diesel engine 110, the exhaust gases may include particulates, such as soot, visible smoke, and oxides of nitrogen ($NO_x$).

In order to limit the amount of $NO_x$ in those emissions, nitrogen enriched air can be supplied through the air intake line 112 to the engine 110. In order to provide the nitrogen enriched air to the air intake line 112, the control valve 213 is operated to permit at least some of the ambient air flowing in the air duct 218 to be diverted to the secondary path 124 and the control valve 136 is operated to permit air flowing in an air duct 152 to flow through an air duct 190 to the mixing chamber 122. When the control valves 213 and 136 are so operated, at least a portion of the air flowing through the turbocompressor 214 will be diverted to the secondary path 124 such that the diverted pressurized air will flow into an air duct 220 (as indicated by an arrow 220a) toward an input 148 of the membrane device 118. The diverted ambient air will flow toward the input 148 of the membrane device 118 through the air duct 220. Consequently, a differential pressure is established across the input 148 and the output 130 of the membrane device 118 (the pressure of the air flowing from the turbocompressor 212 can be in the range of 15 to 45 pounds per square inch such that the input 148 will be at a higher pressure than the ambient pressure at the output 130). This differential in pressure across the membrane device 118 will result in the diverted air flowing into the input 148 and through the membrane device 118 so that oxygen enriched air will permeate from the higher pressure, upstream side of the membrane device 118 at the input 148 to the lower pressure, downstream side of the membrane device 118 at the outlet 130 and thereby to an outlet duct 150 and the nitrogen enriched air will likewise flow out of the output 132 to the outlet duct 152.

The membrane device 118 maybe of the same type that is used in connection with the air control system 16 and that is disclosed in FIGS. 2 and 3A–3C. This type of membrane device 118 is adapted to separate oxygen and nitrogen present in the air being supplied through the input 148 so as to produce oxygen enriched air (permeate) at the outlet 130 and nitrogen enriched air (retentate) at the other outlet 132.

The particular percentage of oxygen contained within the air flowing out from the output 130 of the membrane device 118 and the particular percentage of nitrogen contained within the air flowing out from the output 132 of the membrane device 118 can be adjusted by providing the proper membrane device 118. In this regard, the membrane surface area and the pressure differential across the membrane device 118 will in part determine the amount of nitrogen separated from the ambient air and thereby the percentage of nitrogen within the air flowing out from output 132. In general, the oxygen enriched air flowing from the output 130 may contain about 23% to 30% oxygen concentration by volume and the nitrogen enriched air flowing from the output 132 may contain about 79% to 98% nitrogen concentration by volume.

Once the oxygen enriched air is produced by the membrane device 118, it will flow from the output 130 through the air duct 150 (as indicated by an arrow 150a) and be vented to the atmosphere. On the other hand, the nitrogen enriched air flowing from the output 132 can be used to supply the air intake line 112 of the engine 110 with a high concentration of nitrogen (for example 80% to 90% nitrogen concentration by volume). In order to so supply the nitrogen enriched air to the air intake line 112, the control valve 136 is operated to permit the nitrogen enriched air flowing in the air duct 152 (as indicated by the arrows 152a, 152b, 152c, and 152d) to flow through the air duct 190 (as indicated by an arrow 190a) to the mixing chamber 122 (when no nitrogen enriched air is to be supplied to the mixing chamber 122, the control valve 136 is operated to expel the air flowing in the air duct 152 to atmosphere through an air duct 182 (as indicated by an arrow 182a). The nitrogen enriched air flowing into the mixing chamber 122 from the duct 190 and the ambient air flowing into the mixing chamber 122 from the air ducts 218 and 219 will mix within the mixing chamber 122 so that air with the desired concentration of nitrogen can be supplied to the engine 110.

The amount of ambient air supplied to the mixing chamber 122 and the amount of nitrogen enriched air supplied to the mixing chamber 122 is in part dependent on the operating conditions (load and speed) of the engine 110, the pressure that is developed by the turbocompressor 212 on the air flowing into the air duct 214, and the extent to which the control valve 213 permits ambient air in the duct 218 to be diverted to the secondary path 124. As the pressure of the incoming air from the turbocompressor 212 is increased, a higher differential pressure will be established across the membrane device 118 and as a result, the air being supplied to the mixing chamber 122 through the air ducts 152 and 190 will contain a higher percentage of nitrogen enriched air. In order to ensure that the air within the mixing chamber 122 does not become over pressurized or supercharged, a pressure relief valve 192 is used with the mixing chamber 122 to exhaust to atmosphere air in the mixing chamber 122 in the event that the pressure in the mixing chamber 122 increases beyond a preselected level.

While controlling the amount of nitrogen in the intake air being supplied to the engine 110 can aid in decreasing $NO_x$ in the exhaust gases flowing in the exhaust line 114, the exhaust gases under certain operating conditions of the engine 110 may have too high a level of $NO_x$. As is indicated above, at least some of the nitrogen enriched air produced by the membrane device 118 and flowing in the air duct 152 can be supplied to the $NO_x$ control device 140 when the control valve 138 is operated to permit the flow of the nitrogen enriched air through a duct 184 (as indicated by an arrow 184a) and an air duct 186 (as indicated by arrows 186a and 186b). The molecular nitrogen in the nitrogen enriched air supplied to the $NO_x$ control device 140 is subjected to a corona or arc discharge so as to create a plasma. As a result, atomic nitrogen is produced and this atomic nitrogen then flows through a duct 188 (as indicated by an arrow 188a) so as to be injected into the exhaust line 114. The injection of the atomic nitrogen into the exhaust gases flowing in the exhaust line 114 causes the oxides of nitrogen to be chemically reduced into nitrogen and oxygen such that the emissions from the engine 110 will have acceptable, lower levels of $NO_x$.

As can be appreciated, it is preferable to control the operation of the control valves 213, 136 and 138 as well as the turbocompressor 212 from a central control unit. By having the control valves 213, 136 and 138 and the turbocompressor 212 operated from a central control unit, the control unit can be calibrated for the particular engine 110 based at least in part on the engine load and speed so that the intake air flowing in the intake line 112 to the engine 110 has the desired nitrogen content during various phases or times of operation of the engine 110. The control unit additionally can be provided information as to the concentration of oxygen in the air flowing from the output 132 of the membrane device 118 and from the mixing chamber 122 so that the control valve 136 also can be controlled based on the concentration of nitrogen in the air being supplied to the engine 110. For example, an oxygen sensor 196 can be coupled to the air duct 152 to provide information of the oxygen/nitrogen concentration in the air flowing from the retentate output 132 of the membrane device 118 and an oxygen sensor 198 can be coupled to the air intake line 112 to provide information of the oxygen concentration in the air being supplied from the mixing chamber 122 into the engine 110. In this manner, undesirable $NO_x$ emissions in the exhaust gases flowing through the exhaust line 114 from the engine 110 can be decreased to acceptable levels.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An air control system for an internal combustion engine for selectively supplying ambient air from an air inlet means, oxygen enriched air and nitrogen enriched air to an air intake of said engine so as to limit pollutants in gases emitted through an exhaust of said engine, said air control system comprising:

an air mixing chamber in fluid communication with said air intake of said engine;

a first air flow means in fluid communication with said inlet means and said air mixing chamber through which said ambient air is supplied to said air mixing chamber from said inlet means;

a second air flow means in fluid communication with said inlet means having a nitrogen and oxygen separating means for producing from said ambient air oxygen enriched air at a first output and nitrogen enriched air at a second output; and air directing means associated with said first and second outputs and said mixing chamber for controlling the flow of said oxygen enriched air from said first output to said mixing chamber and said nitrogen enriched air from said second output to said mixing chamber such that said oxygen enriched air, said nitrogen enriched air, and said ambient air can be selectively provided through said mixing chamber to said air intake of said engine.

2. An air control system as set forth in claim 1 wherein said air directing means includes a first control valve for controlling the flow of oxygen enriched air from said first output to said mixing chamber and a second control valve controlling the flow of nitrogen enriched air from said second output to said mixing chamber.

3. An air control system as set forth in claim 1 wherein said separating means includes a selectively permeable membrane for separating nitrogen from ambient air so that oxygen enriched air is produced at said first output and nitrogen enriched air is produced at said second output.

4. An air control system as set forth in claim 3 wherein said selectively permeable membrane includes hollow polymer fibers that separate nitrogen and oxygen from ambient air.

5. An air control system as set forth in claim 4 wherein said hollow polymer fibers are in fiber bundles disposed in cartridges within an outer housing.

6. An air control system as set forth in claim 5 wherein said hollow polymer fibers are formed of perfluorodioxole membrane material.

7. An air control system as set forth in claim 1 wherein said separating means produces oxygen enriched air containing about 23%–30% oxygen concentration by volume at said first output.

8. An air control system as set forth in claim 1 wherein said separating means produces nitrogen enriched air containing about 79%–98% nitrogen concentration by volume at said second output.

9. An air control system as set forth in claim 1 including a pressure differential means associated with said separating means to establish a differential pressure across said separating means so that at least a portion of said ambient air flows through said separating means.

10. An air control system as set forth in claim 1 including a nitrogen control valve means associated with said separating means to control the flow of nitrogen enriched air from said second output to a nitrogen oxide control means, said nitrogen oxide control means producing monatomic-nitrogen to be injected into said exhaust of said engine to reduce oxides of nitrogen in said exhaust.

11. An air control system as set forth in claim 1 including oxygen sensing means associated with said first output, said second output and said air intake.

12. An air control system for an internal combustion engine for selectively supplying ambient air from an air inlet means, oxygen enriched air and nitrogen enriched air to an air intake of said engine so as to limit pollutants in gases emitted through an exhaust of said engine, said air control system comprising:

an air mixing chamber in fluid communication with said air intake of said engine;

a first air flow means in fluid communication with said inlet means and said air mixing chamber through which said ambient air is supplied to said air mixing chamber from said inlet means;

a second air flow means in fluid communication with said inlet means having a nitrogen and oxygen separating means for producing from said ambient air oxygen enriched air at a first output and nitrogen enriched air at a second output;

an oxygen control valve between said first output and said mixing chamber for controlling the flow of said oxygen enriched air from said first output to said mixing chamber; and a nitrogen control valve between said second output and said mixing chamber for controlling the flow of said nitrogen enriched air from said second output to said mixing chamber such that said oxygen enriched air, said nitrogen enriched air, and said ambient air can be selectively provided through said mixing chamber to said air intake of said engine.

13. A method of selectively supplying oxygen enriched air, nitrogen enriched air and ambient air to a mixing chamber in fluid communication with an air intake of an internal combustion engine so as to reduce the amount of pollutants present in the gases being emitted from an exhaust of said internal combustion engine, said method comprising:

selectively diverting at least a portion of said ambient air through a separating means so that oxygen enriched air is produced at a first output of said separating means and nitrogen enriched air is produced at a second output of said separating means; and selectively controlling the flow of said oxygen enriched air from said first output to said mixing chamber and selectively controlling the flow of said nitrogen enriched air from said second output to said mixing chamber whereby the air being supplied from said mixing chamber to said air intake of said engine contains a desired concentration of oxygen and nitrogen.

14. A method as set forth in claim 13 wherein said separating means includes selectively permeable membrane means.

15. A method as set forth in claim 13 wherein said oxygen enriched air contains 23%–30% oxygen concentration by volume.

16. A method as set forth in claim 13 wherein said nitrogen enriched air contains 79%–98% nitrogen concentration by volume.

17. An air control system for an internal combustion engine, said engine having a pressure means for providing pressurized ambient air, for selectively supplying ambient air and nitrogen enriched air to an air intake of said engine so as to limit pollutants in gases emitted through an exhaust of said engine, said air control system comprising:

an air mixing chamber in fluid communication with said air intake of said engine;

a first air flow means in fluid communication with said pressure means and said air mixing chamber through which said ambient air is supplied to said air mixing chamber from said pressure means;

a second air flow means in fluid communication with said pressure means having a nitrogen and oxygen separating means for producing from said ambient air oxygen enriched air at a first output and nitrogen enriched air at a second output, said ambient air flowing through said separating means due to the differential pressure produced across said separating means by said pressure means; and air directing means associated with said second output and said mixing chamber for controlling the flow of said nitrogen enriched air from said second output to said mixing chamber such that said nitrogen enriched air and said ambient air can be selectively provided through said mixing chamber to said air intake of said engine.

18. An air control system as set forth in claim 17 wherein said pressure means is a turbocompressor operated by a turbocharger associated with said exhaust of said engine.

* * * * *